United States Patent
Zhou et al.

(10) Patent No.: US 11,892,812 B1
(45) Date of Patent: Feb. 6, 2024

(54) GIMBAL ADJUSTMENT METHOD, GIMBAL ADJUSTMENT DEVICE, MOBILE PLATFORM AND STORAGE MEDIUM

(71) Applicant: SZ DJI TECHNOLOGY CO., LTD., Shenzhen (CN)

(72) Inventors: You Zhou, Shenzhen (CN); Jie Liu, Shenzhen (CN); Changchun Ye, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 440 days.

(21) Appl. No.: 17/302,922

(22) Filed: May 14, 2021

Related U.S. Application Data

(63) Continuation of application No. PCT/CN2018/116439, filed on Nov. 20, 2018.

(51) Int. Cl.
| | |
|---|---|
| G05B 19/19 | (2006.01) |
| F16M 11/18 | (2006.01) |
| F16M 11/12 | (2006.01) |
| G05D 3/20 | (2006.01) |
| G05D 1/00 | (2006.01) |

(52) U.S. Cl.
CPC ............ *G05B 19/19* (2013.01); *F16M 11/123* (2013.01); *F16M 11/18* (2013.01); *G05D 3/20* (2013.01); *G05D 1/0094* (2013.01)

(58) Field of Classification Search
CPC ...... G05B 19/19; F16M 11/123; F16M 11/18; G05D 3/20; G05D 1/0094
USPC ........................................................ 318/648
See application file for complete search history.

(56) References Cited

U.S. PATENT DOCUMENTS

| | | | |
|---|---|---|---|
| 2012/0162475 A1 | 6/2012 | Lin et al. | |
| 2016/0159463 A1 | 6/2016 | Wang et al. | |
| 2016/0292865 A1 | 10/2016 | Floor et al. | |
| 2017/0147081 A1* | 5/2017 | Kwon | .............. G06T 7/20 |

(Continued)

FOREIGN PATENT DOCUMENTS

| | | |
|---|---|---|
| CN | 101860732 A | 10/2010 |
| CN | 102122172 A | 7/2011 |

(Continued)

OTHER PUBLICATIONS

Jianjun Gui, et al., A review of visual inertial odeometry from filtering and optimization perspectives, Advanced Robotics, Sep. 30, 2015.

*Primary Examiner* — Jorge L Carrasquillo
(74) *Attorney, Agent, or Firm* — ANOVA LAW GROUP, PLLC

(57) ABSTRACT

The present disclosure provides a gimbal adjustment method. The method includes obtaining a reference image frame sequence and a reference shooting trajectory formed by a movement of a mobile platform when shooting the reference image frame sequence, the reference image frame sequence including two or more reference image frames, the mobile platform including a gimbal and an imaging assembly; estimating a shooting angle based on the reference shooting trajectory, and adjusting the gimbal based on an estimated shooting angle during an image re-shooting; obtaining a current image frame; and determining an amount of adjustment control of the gimbal based on the current image frame and the reference image frame sequence, and adjusting the gimbal based on the amount of adjustment control.

20 Claims, 5 Drawing Sheets

(56) References Cited

U.S. PATENT DOCUMENTS

2018/0041708 A1    2/2018  Wu et al.
2019/0179216 A1*  6/2019  Cao ..................... H04N 23/683

FOREIGN PATENT DOCUMENTS

| CN | 105554394 A | | 5/2016 |
|---|---|---|---|
| CN | 107077152 A | | 8/2017 |
| CN | 107370941 A | | 11/2017 |
| CN | 107807659 A | | 3/2018 |
| CN | 108111752 A | | 6/2018 |
| CN | 108475074 A | | 8/2018 |
| CN | 110800282 A | | 2/2020 |
| WO | PCT/CN2018/116439 | * | 3/2019 |
| WO | WO 2019084719 A1 | * | 5/2019 |

\* cited by examiner

GIMBAL ADJUSTMENT METHOD, GIMBAL ADJUSTMENT DEVICE, MOBILE PLATFORM AND STORAGE MEDIUM

CROSS-REFERENCE TO RELATED APPLICATIONS

This application is a continuation of International Application No. PCT/CN2018/116439, filed on Nov. 20, 2018, the entire content of which is incorporated herein by reference.

TECHNICAL FIELD

The present disclosure relates to the field of electronic technology and, more specifically, to a gimbal adjustment method, a gimbal adjustment device, a mobile platform, and a storage medium.

BACKGROUND

In the shooting process of video production, in order to shoot the same scene, it is generally needed to repeat the shooting multiple times to obtain the best image. The process of repeatedly shoot the same scene can be referred to as image re-shooting. In the process of each image re-shooting, the gimbal will change the angle based on the angle parameters corresponding to the shooting trajectory of the sample, such that the camera fixed on the gimbal can shoot the scene. The gimbal is a supporting device for mounting and fixing the camera. In the process of each re-shooting, there are generally differences in shooting time, shooting trajectory, and the positon of each shooting object in the scene. If the gimbal only performs angle change based on the angle parameters corresponding to the shooting trajectory of the sample, it will result in poor shooting effect of the camera. Therefore, there is a need to adjust the gimbal during shooting.

SUMMARY

One aspect of the present disclosure provides a gimbal adjustment method. The method includes obtaining a reference image frame sequence and a reference shooting trajectory formed by a movement of a mobile platform when shooting the reference image frame sequence, the reference image frame sequence including two or more reference image frames, the mobile platform including a gimbal and an imaging assembly; estimating a shooting angle based on the reference shooting trajectory, and adjusting the gimbal based on an estimated shooting angle during an image re-shooting; obtaining a current image frame; and determining an amount of adjustment control of the gimbal based on the current image frame and the reference image frame sequence, and adjusting the gimbal based on the amount of adjustment control.

Another aspect of the present disclosure provides a gimbal adjustment device. The device includes a processor, and a storage device storing program instructions. When executed by the processor, the program instructions cause the processor to obtain a reference image frame sequence and a reference shooting trajectory formed by a movement of a mobile platform when shooting the reference image frame sequence, the reference image frame sequence including two or more reference image frames, the mobile platform including a gimbal and an imaging assembly; estimate a shooting angle based on the reference shooting trajectory, and adjust the gimbal based on an estimated shooting angle during an image re-shooting; obtain a current image frame; and determine an amount of adjustment control of the gimbal based on the current image frame and the reference image frame sequence, and adjust the gimbal based on the amount of adjustment control.

Another aspect of the present disclosure provides a mobile platform. The mobile platform includes an imaging assembly configured to capture images; a gimbal configured to control an orientation of the imaging assembly; a body; a power system disposed on the body to provide power to the mobile platform; and a gimbal adjustment device including a processor and a storage device storing program instructions. When executed by the processor, the program instructions cause the processor to obtain a reference image frame sequence and a reference shooting trajectory formed by a movement of a mobile platform when shooting the reference image frame sequence, the reference image frame sequence including two or more reference image frames, the mobile platform including a gimbal and an imaging assembly; estimate a shooting angle based on the reference shooting trajectory, and adjust the gimbal based on an estimated shooting angle during an image re-shooting; obtain a current image frame; and determine an amount of adjustment control of the gimbal based on the current image frame and the reference image frame sequence, and adjust the gimbal based on the amount of adjustment control.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Figure 1A:
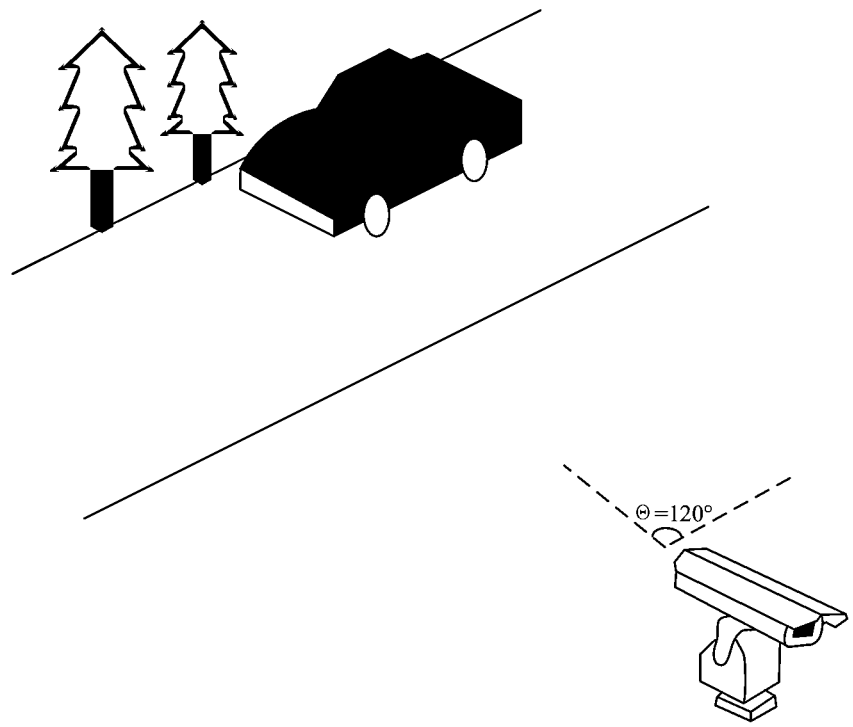
FIG. 1A is an application scenario of a gimbal adjustment method according to an embodiment of the present disclosure.

In order to make the objectives, technical solutions, and advantages of the present disclosure more clear, the technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure. In the situation where the technical solutions described in the embodiments are not conflicting, they can be combined.

It should be noted that, when one component is referred to as "fixed to" another component, it may be directly on another component or it is also possible that there is a third component between them. When one component is considered to "connect" another component, it may be directly connected to the other component or it is possible that there is a third component between them. When one component is considered to be "disposed on" another component, it may be directly disposed on the other component or it is possible that there is a third component between them.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure. The term "and/or" as used herein includes any and all combinations of one or more related listed items.

Exemplary embodiments will be described with reference to the accompanying drawings. In the case where there is no conflict between the exemplary embodiments, the features of the following embodiments and examples may be combined with each other.

An embodiment of the present disclosure provides a gimbal adjustment method, which can be applied to a mobile platform. The mobile platform may include a gimbal and an imaging assembly, where the gimbal may be a supporting device for mounting and fixing the imaging assembly. Therefore, the imaging assembly disposed on the mobile platform can be fixed on the gimbal, and the orientation of the gimbal may be the same as the orientation of the imaging assembly. In some embodiments, the mobile platform may include, but is not limited to, an unmanned aerial vehicle (UAV) and a gimbal camera. The gimbal camera may refer to a camera with a gimbal, which can control the camera to shoot from multiple angles. The gimbal adjustment method provided in the embodiments of the present disclosure also relates to a device with a shooting preview function, such as a camera display screen with a front camera, s smart device connected to a UAV, an image stabilization system, etc. The gimbal adjustment method provided in the embodiments of the present disclosure can realize the adjustment of the gimbal in the process of image re-shooting based on a reference image frame sequence, such that the imaging assembly fixed on the gimbal can take better shots of the scene and improve the shooting effect.

Before the image is re-shot, it may be needed to take a sample, and the sample may refer to a sequence of image frames obtained by taking the first shot of the target scene. The main purpose of shooting the sample is to determine the approximate target scene, camera position, and composition, where the target scene may refer to the scene that includes one or more target objects to be imaged, the camera position may refer to the shooting position of the imaging assembly, (including the shooting angle), and the composition (also referred to as framing) may refer to the image to be expressed organized and arranged by the photographer within a certain space to form a specific structure between parts of the image and the whole image in the image space. In the process of shooting the sample, the vision system may also record the shooting trajectory formed by the movement of the mobile platform when shooting the sample. The visual system may be the visual inertial odometer (VIO) of the downward visual positioning system. It should be noted that the shooting trajectory and the sample can may have a one-to-one correspondence through the physic timeline. Any shooting position in the shooting trajectory may correspond to an angle parameter of the gimbal. This angle parameter may indicate the angle of the gimbal at that position, that is, the shooting angle of the imaging assembly at that position.

After shooting the sample, one or more image re-shooting can be performed. In the subsequent image re-shooting process, the mobile platform may obtain the reference image frame sequence and the reference shooting trajectory formed by the movement of the mobile platform when the reference image frame sequence is taken. The reference image frame sequence may include two or more reference image frames, and each reference image frame may be arranged in sequence based on the order to the shooting time. The reference image frame sequence may be a sample taken before the image re-shooting, or it may be a sequence of image frames taken before the current image re-shooting (or the image re-shooting). For example, the current image re-shooting may be the fifth re-shooting, then the reference image frame sequence may be the second, third, or fourth historical image re-shooting. The mobile platform may move based on the reference shooting trajectory. Since any shooting positioning in the reference shooting trajectory may correspond to an angle parameter of the gimbal, during the movement of the mobile platform, the shooting angle may also be estimated based on the reference shooting trajectory, and the gimbal may be adjusted based on the estimated shooting angle. For example, if the estimated shooting angle based on the reference shooting trajectory is 120°, the angle of the gimbal may be adjusted to 120°, as shown in FIG. 1A.

Figure 1B:
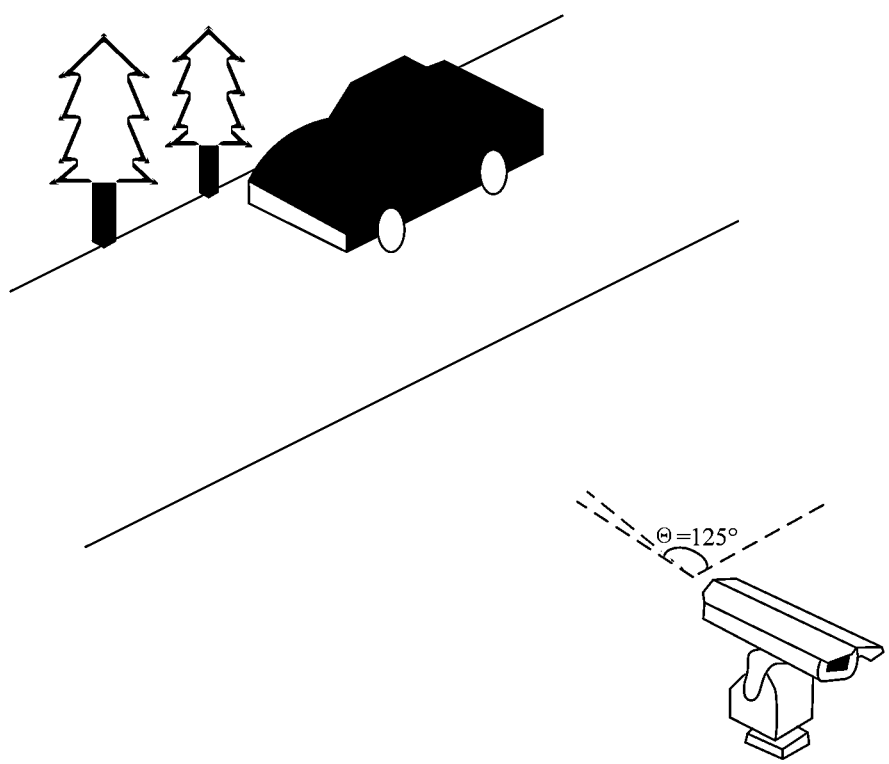
FIG. 1B is an application scenario of another gimbal adjustment method according to an embodiment of the present disclosure.

Since there are generally differences in the shooting time, shooting trajectory, and the position of each target object in the target scene during each image re-shooting process, in order to better perform the re-shooting, the mobile platform may also obtain eh current image frame, determine the adjustment control amount of the gimbal based on the current image frame and the reference image frame sequence, and adjust the gimbal again based on the adjustment control amount. For example, adjusting the control amount may be that the shooting is at 125°, then the gimbal can be adjusted again such that the angle of the gimbal is at 125°, as shown in FIG. 1B.

It can be seen that in the above gimbal adjustment process, the gimbal can be roughly adjusted based on the reference shooting trajectory. When the shooting trajectory, shooting time, and the position of each target object in the target scene change slightly, the amount of adjustment control can be determined based on the current image frame and the previous reference image frame sequence, such that based on the roughly adjustment, the gimbal can be adjusted again based on the amount of adjustment control, such that the entire re-shooting process can be smoother and faster and the image frame sequence obtained by the re-shooting can meet the user's needs, thereby reducing the number of re-shooting and improving the re-shooting efficiency.

Figure 2:
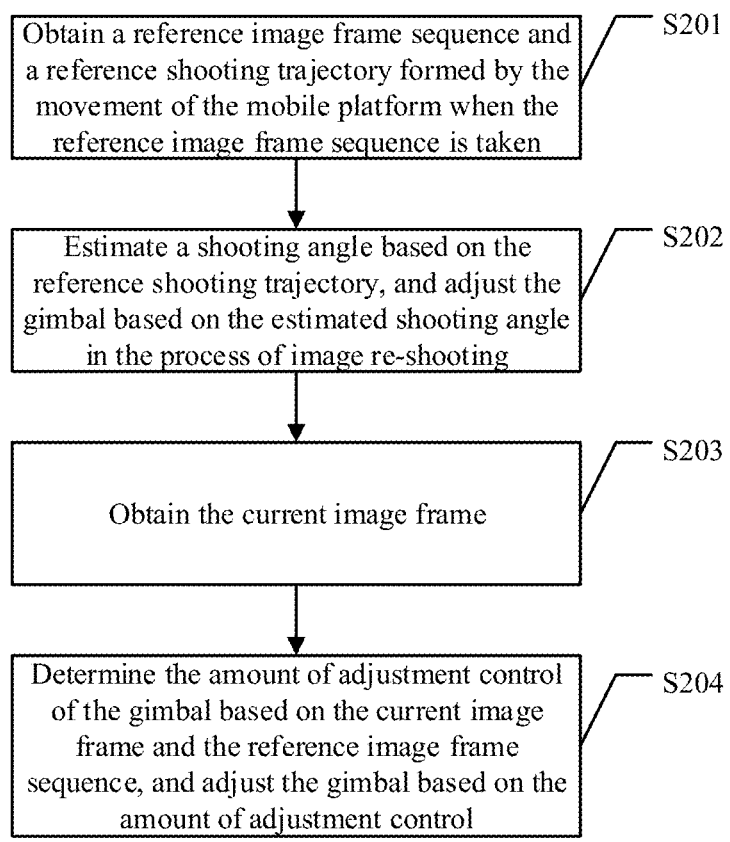
FIG. 2 is a flowchart of a gimbal adjustment method according to an embodiment of the present disclosure.

Based on the above description, an embodiment of the present disclosure provides a gimbal adjustment method, which can be applied to a mobile platform. FIG. 2 is a flowchart of a gimbal adjustment method according to an embodiment of the present disclosure. The method will be described in detail below.

S201, obtaining the reference image frame sequence and the reference shooting trajectory formed by the movement of the mobile platform when the reference image frame sequence is taken.

The reference image frame sequence may include two or more reference image frames, and each reference image frame may be arranged in sequence based on the order of shooting time. In one embodiment, when obtaining the reference image frame sequence, the sample taken before the re-shooting can be obtained, and the sample can be used as the reference image frame sequence. In another embodiment, when obtaining the reference image frame sequence, the image frame sequence taken by the historical image re-shooting before the current image re-shooting can be obtained, and the image frame sequence taken by the historical image re-shooting can be used as the reference image frame sequence.

Since in the process of each image re-shooting, the VIO can be used to record the shooting trajectory formed by the movement of the mobile platform when the image frame sequence is taken. Therefore, the reference shooting trajectory formed by the movement of the mobile platform when the reference image frame sequence recorded by the VIO can also be obtained. Any shooting position in the reference shooting trajectory may correspond to an angle parameter of the gimbal, and the angle parameter may indicate the angle (or orientation) of the gimbal at that position. It can be seen from the foregoing description that the imaging assembly can be fixed on the gimbal, such that the angle (or orientation) of the gimbal may be consistent with the shooting angle of the imaging assembly, that is, the angle parameter may also indicate the shooting angle of the imaging assembly. When the angle of the gimbal is changed, the shooting angle of the imaging assembly may also change with the change of the angle of the gimbal.

S202, estimating the shooting angle based on the reference shooting trajectory, and adjusting the gimbal based on the estimated shooting angle in the process of image re-shooting.

In the process of image re-shooting, the mobile platform may move based on the reference shooting trajectory, and the position of the gimbal disposed on the mobile platform may also change accordingly. Therefore, the position of the gimbal may be determined in real time or at fixed time points, and the target angle parameters of the gimbal corresponding to the position of the gimbal in the reference shooting trajectory can be obtained. After obtaining the target angle parameter of the gimbal, the shooting angle can be estimated based on the target angle parameter. More specifically, the angle indicated by the target angle parameter may be used as the estimated shooting angle. For example, if the target angle parameter is "90, 60", the angle indicated by the target angle parameter may be "90° in the vertical direction and 60° in the horizontal direction." The estimated shooting angle may be "90° in the vertical direction and 60° in the horizontal direction."

Since the imaging assembly is fixed on the gimbal, the shooting angle of the imaging assembly may be adjusted by adjusting the angle of the gimbal. Therefore, after the estimates shooting angle is determined, the gimbal can be adjusted based on the estimated shooting angle, and the angle of the gimbal can be adjusted to the estimate shooting angle.

S203, obtaining the current image frame.

The current image frame here may refer to the image frame sampled from the image collection taken by the imaging assembly based on a preset image sampling rule.

The image sampling rule may include the number of different pixels between the current image frame obtained by sampling and the image frame obtained by the previous sampling is within a preset range. In some embodiments, the different pixels may refer to the different pixels between the current image frame and the image frame obtained in the previous sampling, and the value of the preset range may be set based on the empirical values or business requirements. Practice has shown that if an image frame with a smaller number of different pixels form the image frame obtained in the previous sampling is used as the current image frame, the amount of calculation to be performed at the process of S204 may be relatively large. At the same time, if an image frame with a larger number of different pixels from the image frame obtained in the previous sampling is used as the current image frame, the accuracy of the process at S204 may be relatively low. Therefore, in the embodiments of the present disclosure, when obtaining the current image frame, the image frame with the number of different pixels between the image frame obtained in the last sampling within the preset range can be taken as the current image frame, thereby reducing the amount of calculation to be performed at the process at S204 and improving the accuracy of the process at S204.

Correspondingly, a specific method for obtaining the current image frame may be as follow. First, obtain an image collection taken by the imaging assembly, the image collection may include at least one frame of images. The imaging assembly may capture images in real time, and add the captured image frames to the image collection, that is, the image collection can be update in real time. Subsequently, the current image frame can be sampled from the image collection based on the preset image sampling rule, and the current image frame obtained by the sampling can be image frame newly added to the image collection. For example, the image collection may include image frame a, image frame b, and image frame c. The imaging assembly may capture image frame d and add the image frame d to the image collection. At this time, the latest image frame added to the image collection is the image frame d. Since the number of different pixels between the image frame d and the image frame obtained in the previous sampling may be within the preset range, the image frame d may be used as the current image frame.

S204, determining the amount of adjustment control of the gimbal based on the current image frame and the reference image frame sequence, and adjusting the gimbal based on the amount of adjustment control.

When determining the amount of adjustment control of the gimbal based on the current image frame and the reference image frame sequence, image registration can be performed based on the reference image frame sequence and the reference image frame sequence, and the amount of adjustment control of the gimbal may be determined based on the image registration result. The amount of adjustment control may include a first angle parameter and a second angle parameter of the gimbal. In some embodiments, the first angle parameter may be the angle parameter of the gimbal in the horizontal direction, and the second angle parameter may be the angle parameter of the gimbal in the vertical direction.

In one embodiment, before determining the amount of adjustment control of the gimbal based on the reference image frame sequence and the reference image frame sequence, whether the difference between the current shooting trajectory and the reference shooting trajectory meet a preset condition can be determined based on the current shooting trajectory formed by the movement of the mobile platform when shooting the reference image frame sequence recorded by the VIO, and the measured values of the inertial measurement unit (IMU) and the electronic compass. If the condition is met, then the subsequent process of determining the amount of adjustment control of the gimbal with reference image frame sequence and the reference image frame sequence may be performed. If the condition is not met, then the orientation of the gimbal may be adjusted. The orientation of the gimbal mentioned above may be understood as the angle of the gimbal.

Consistent with the present disclosure, a reference image frame sequence, and a reference shooting trajectory formed by the movement of the mobile platform when the reference image frame sequence is taken can be obtained. During the image re-shooting process, the shooting angle can be estimated based on the reference shooting trajectory, and the gimbal can be adjusted based on the estimated shooting angle. The current image frame can be obtained, the amount of adjustment control of the gimbal can be determined based on the current image frame and the reference image frame sequence, and the gimbal can be adjusted based on the amount of adjustment control. In the gimbal adjustment process described above, the gimbal can be roughly adjusted based on the reference shooting trajectory. When the shooting trajectory changes slightly, the amount of adjustment control can be determined based on the current image frame and the previous reference image frame sequence. Based on the rough adjustment, the gimbal can be adjusted again based on the amount of adjustment control. In this way, the entire re-shooting process can be smoother and faster and the image frame sequence obtained by the re-shooting can meet the user's needs, thereby reducing the number of re-shooting and improving the re-shooting efficiency.

Figure 3:
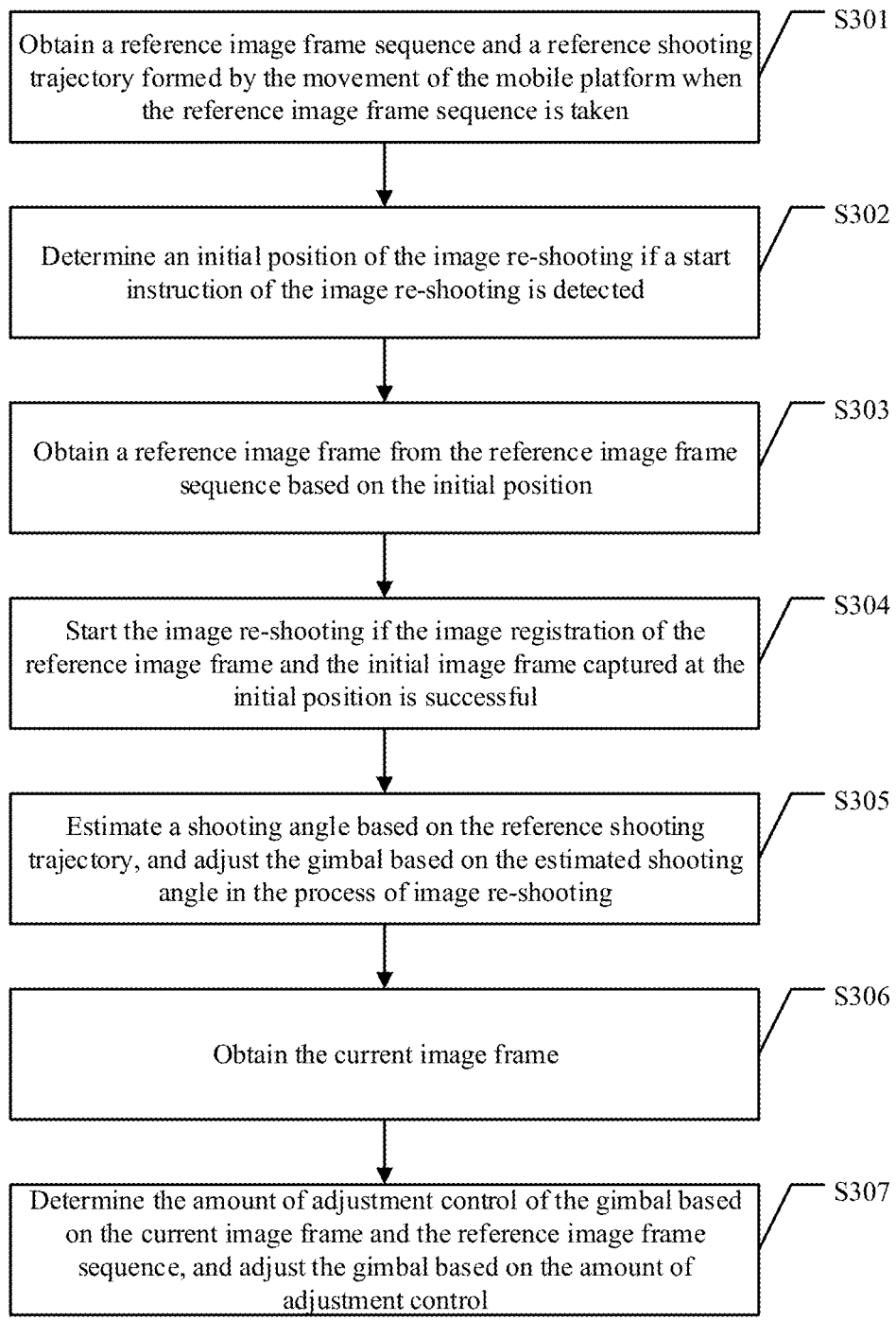
FIG. 3 is a flowchart of the gimbal adjustment method according to another embodiment of the present disclosure.

Based on the above description, an embodiment of the present disclosure provides a gimbal adjustment method, which can be applied to a mobile platform. FIG. 3 is a flowchart of the gimbal adjustment method according to another embodiment of the present disclosure. The method will be described in detail below.

S301, obtaining a reference image frame sequence and a reference shooting trajectory formed by the movement of the mobile platform when the reference image frame sequence is taken, the reference image frame sequence including two or more reference image frames.

More specifically, the reference image frame sequence can be obtained from the imaging assembly. In order to reduce the amount of data transmitted and improve the transmission efficiency, the embodiments of the present disclosure may perform compression processing on the reference image frame sequence captured by the imaging assembly to obtain an image compression package, and obtain the image compression package from the imaging assembly, thereby improving the acquisition efficiency. The image compression package may include an I frame and a P frame. In some embodiments, I frame may also be referred to as the internal image, which may be the first frame of the compression process. I frame can be understood as a compressed frame based on the original image captured by the imaging assembly. The P frame may be referred to as the frame obtained by compressing the data of the current frame based on the difference between the current frame and the adjacent previous frame (I frame or P frame). P frame may be understood as a compressed frame based on the image difference between the original image captured by the imaging assembly and the previous image.

S302, determining an initial position of the image re-shooting if a start instruction of the image re-shooting is detected, the initial position can be used as the starting position of the current shooting trajectory.

The initial position can be determined based on any shooting position in the reference shooting trajectory, that is, the image can be retaken from any shooting position, which can improve the flexibility and compatibility of the image re-shooting. For example, the initial shooting position in the reference shooting trajectory can be selected as the initial position, that is, the starting position of the current shooting trajectory at this time may be the same or similar to the starting shooting position of the reference shooting trajectory. Or, a shooting position at a preset distance from the starting position in the reference shooting trajectory may be selected as the starting position, that is, the distance between the starting position of the current shooting trajectory and the starting shooting positon of the reference shooting trajectory at this time may be equal to the preset distance. Or, a midpoint shooting position in the reference shooting trajectory may be selected as the starting position, that is, the starting position of the current shooting trajectory at this time may be the same or similar to the midpoint shooting position of the reference shooting trajectory.

When performing image re-shooting, the mobile platform may be placed in the initial position, and the camera orientation may be adjusted to be roughly the same as when the reference image frame sequence was taken, that is, the angle of the gimbal may be adjusted such that the angle of the adjusted gimbal may be substantially the same as the when the angle of the gimbal when the reference image frame sequence was taken. Then the re-shooting mode can be entered, and the photographer may click the re-shooting function button in the user interface to turn on the re-shooting model. Correspondingly, the start instruction of the image re-shooting may include the user's click instruction. That is, when the click instruction of the photographer is detected, the start instruction of the image re-shooting can be determined as detected. In some embodiments, the start instruction of the image re-shooting may include a pressing instruction, a voice instruction, etc. After the start instruction of the image re-shooting is detected, the initial position of the image re-shooting can be determined by measuring devices such as the IMU or the electronic compass.

S303, obtaining a reference image frame from the reference image frame sequence based on the initial position, the shooting position corresponding to the reference image frame may correspond to the initial position.

More specifically, the corresponding reference starting position may be determined from the reference shooting trajectory based on the initial position first. For example, the initial position may be the same or similar to the starting position of the reference shooting trajectory, then the reference starting position may be the starting position of the reference shooting trajectory. In another example, the initial position may be the same or similar to the midpoint shooting position of the reference shooting trajectory, then the reference starting position may be the midpoint shooting position in the reference shooting trajectory. Then one or more image frames taken at or near the reference starting position in the reference image frame sequence may be taken as the reference image frame. That is, the number of reference image frames can be more than one frame. For example, the reference image frame may be the I frame. In one embodiment, the reference image frame may also be an IDR frame, and the IDR frame may be the first I frame.

S304, starting the image re-shooting if the image registration of the reference image frame and the initial image frame captured at the initial position is successful. Since the initial position may deviate from the shooting position corresponding to the reference image frame, and/or the angle of the gimbal at the beginning of the shooting may also include deviation, the image frame captured by the current image re-shooting may deviate from the reference image frame sequence. Therefore, in order to avoid this deviation and improve the accuracy of shooting, in this embodiment, after obtaining the reference image frame, image registration may be performed between the reference image frame and the real-time initial image frame captured by the imaging assembly at the initial position. More specifically, in the process of image registration, the gimbal may swing slightly to scan left and right and/or up and down. The imaging assembly may obtain the initial image frame in real time with the slight swing of the gimbal, and perform image registration between the initial image frame and the reference image frame. If the image registration is successful, the image can be retaken directly. In some embodiments, if the image registration is successful, a "start" prompt may be displayed on the user interface. If the photographer's click instruction on the "start" prompt is detected, the image re-shooting will start. It should be noted that a successful image registration may be that the target reference image frame that best matches the initial image frame can be found in each reference image frame.

Generally, an image may include multiple feature points. The feature point may refer to the point in the image that has distinctive characteristics and can effectively reflect the essential characteristics of the image and can identify the target object in the image. A feature point can be composed of a keypoint and a descriptor. The keypoint may refer to the position of the feature point in the image, which can have information such as direction and scale. The descriptor is generally a vector that can be used to describe the information of the pixels around the keypoint. Therefore, when performing image matching, a feature point description algorithm can be used to extract the feature points and the descriptors in the initial image frame (represented by $I_R$) and the reference image frame (represented by $I_T$). The feature point description algorithm may include, but is not limited to, the scale-invariant feature transformation (SIFT) algorithm, the speeded up robust features (SURF) algorithm, the oriented FAST and rotated BRIEF algorithm, etc. The feature point matching can be performed based on the descriptor in the initial image frame and the descriptor in the reference image frame to obtain a matching result. The matching result may include the degree of matching between each reference image frame and the initial image frame. Subsequently, a target reference image frame that best matches the initial image frame can be identified based on the matching result, and the outlier points can be eliminated. In some embodiments, the random sample consensus method and/or the Epipolar constraint method can be used to eliminate the outlier points.

In some embodiments, in the process of identifying the target reference image frame that best matches the initial image frame based on the matching result, the reference image frame corresponding to the maximum matching degree may be used as the target reference image frame. In one embodiment, in order to avoid mismatches, the unique ratio method may also be used to verify whether the target reference image frame is the reference image frame that best matches (or it can be referred to as the first match) the initial image frame; if so, then the image registration can be determined as successful. The principle of the unique ratio method is as follow. Let d1 represents the degree of matching between the reference image frame (i.e., the target reference image frame) that best matches the initial image frame in each reference image frame, the best matched reference image frame being the reference image frame with the highest degree of matching between the initial image frame in the reference image frames. Let d2 represents the degree of matching between the reference image frame in each reference image frame that second-matched the initial image frame (or it can be referred to as the second match), the second-matched reference image frame being the reference image frame with the second highest degree of matching between the initial image frame in the reference image frames. A preset ratio $T_d$ can be set, and the value of the preset ratio can be set and adjusted based on actual needs, which can be an engineering experience value. If d1 and d2 satisfy Formula 1.1, the target reference image frame may be determined to be the reference image frame that best matches the initial image frame.

$$\frac{d_1}{d_2} \geq T_d \qquad \text{Formula 1.1}$$

S305, estimating the shooting angle based on the reference shooting trajectory, and adjusting the gimbal based on the estimated shooting angle in the process of image re-shooting.

S306, obtaining the current image frame.

An image collection taken by the imaging assembly may be obtained, the image collection may include at least one frame of images. The current image frame from the image collection can be sampled based on the preset image sampling rule. The image sampling rule may include the number of different pixels between the current image frame obtained by sampling and the image frame obtained by the previous sampling is within a preset range.

In one embodiment, when shooting the current image frame, the current shooting trajectory formed by the movement of the mobile platform can be obtained. A determination may be made on whether the difference between the reference shooting trajectory and the current shooting trajectory meets a preset condition. If the difference between the reference shooting trajectory and the current shooting trajectory meets the preset condition, the process of determining the amount of adjustment control of the gimbal based on the current image frame and the reference image frame sequence can be performed, that is, the process at S307 can be performed. In another embodiment, if the difference between the reference shooting trajectory and the current shooting trajectory does not meet the preset condition, the target orientation of the gimbal can be calculated based on the current sampling position and the historical reference position. More specifically, the offset angle of the gimbal can be calculated based on the current sampling position and the historical reference position, and the target orientation of the gimbal can be calculated based on the offset angle. In some embodiments, the target orientation of the gimbal can also be calculated based on the current sampling position and the current reference position. After the target orientation is calculated, the gimbal can be corrected based on the target orientation. If the gimbal can be aimed at the target object to a certain extend after the orientation correction, the imaging assembly at this time can accurately capture the target object to a certain extent, and the process at S307 can be performed. If the gimbal cannot be aligned with the target object to a certain extent after the orientation correction, it may indicate that the correction has failed.

In some embodiments, determining whether the difference between the reference shooting trajectory and the current shooting trajectory meets the preset condition may include the following processes.

S11, taking the sampling position corresponding to the current image frame as the current sampling position, and taking the sampling position corresponding to the image frame obtained in the previous sampling as the historical sampling position.

S12, determining the current reference position from the reference shooting trajectory based on the current sampling position, and determining the historical reference position from the reference shooting trajectory based on the historical sampling position.

In one embodiment, in the process of re-shooting the current image, the mobile platform moves based on the reference shooting trajectory to form the current shooting trajectory, therefore, the position information in the reference shooting trajectory may have a one-to-one correspondence with the position information in the current shooting trajectory. The current reference position corresponding to the current sampling position may be determined from the reference shooting trajectory based on the position correspondence, and the historical reference position corresponding to the historical sampling position may be determined from the reference shooting trajectory based on the position correspondence.

In another embodiment, a first reference image frame and a second reference image frame may be determined from the reference image frame sequence based on the current image frame corresponding to the current sampling position, the image frame obtained from the previous sampling corresponding to the historical sampling position, and the preset image sampling rule. The shooting position corresponding to the first image frame can be used as the current reference position, and the shooting position corresponding to the second image frame can be used as the historical reference position. In some embodiments, the first reference image frame and the second reference image frame may meet a condition where the first reference image frame matches the current image frame, and the second reference image frame matches the image frame obtained from the previous sampling. In some embodiments, the first reference image frame and the second reference image frame may also meet a condition where the number of different pixels between the first reference image frame and the second reference image frame is within a preset range.

S13, determining a first moving direction based on the current sampling position and the historical sampling position, and determining a second moving direction based on the current reference position and the historical reference position.

Figure 4:
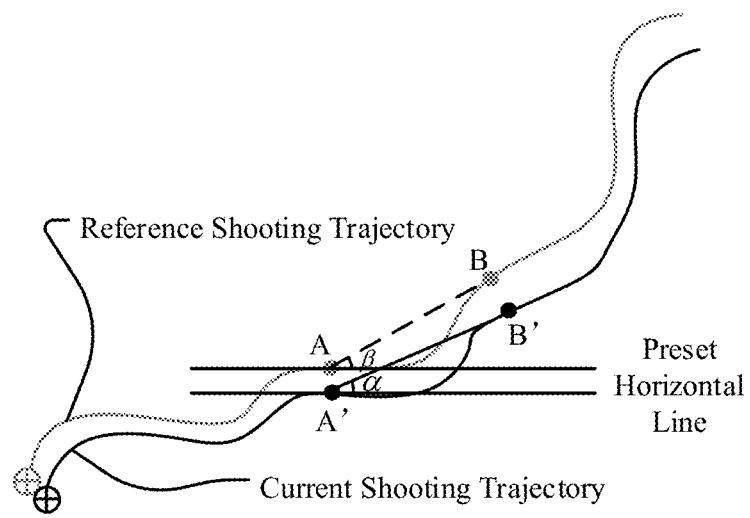
FIG. 4 is a schematic diagram of a shooting trajectory according to an embodiment of the present disclosure.

The first included angle formed by the line between the current sampling position and the historical sampling position and the preset horizontal line can be calculated, and the first included angle can be used as the first moving direction. The second included angle formed by the line between the current reference position and the historical reference position and the preset horizontal line can be calculated, and the second included angle can be used as the second moving direction. As shown in FIG. 4, assume that the historical sampling position is A' and the current sampling position is B', the first angle formed by the connection between A' and B' (represented by a solid line) and the preset horizontal line is calculated as α, then the first moving direction is α. Assume that the historical reference position is A and the current reference position is B, the first angle formed by the connection between A and B (indicated by the dashed line) and the preset horizontal line is calculated as β, then the second moving direction is β.

S14, determining whether the difference between the reference shooting trajectory and the current shooting trajectory meets the preset condition based on the first moving direction and the second moving direction.

Figure 5:
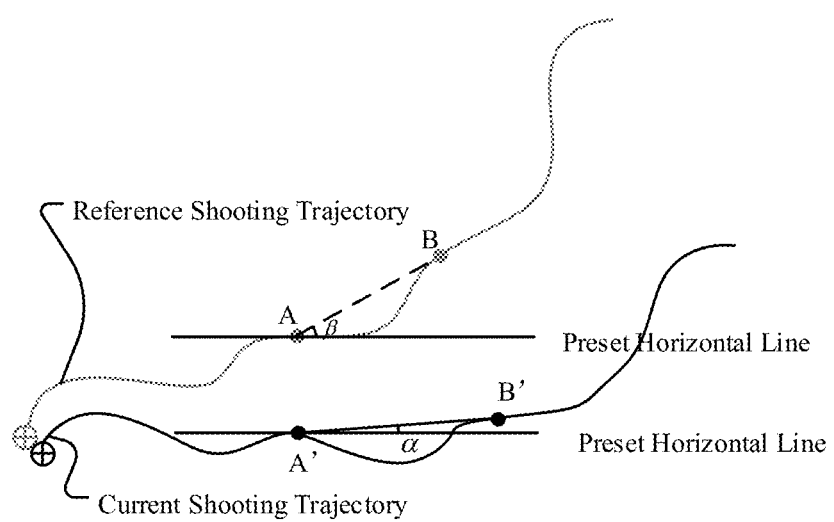
FIG. 5 is a schematic diagram of the shooting trajectory according to another embodiment of the present disclosure.

More specifically, if the difference between the first moving direction and the second moving direction is less than a preset threshold, the difference between the reference shooting trajectory and the current shooting trajectory can be determined as meeting the preset condition. As shown in FIG. 4, at this time, the difference between the reference shooting trajectory and the current shooting trajectory meets the preset condition, and the process of determining the amount of adjustment control of the gimbal based on the current image frame and the reference image frame sequence can be performed. If the difference between the first moving direction and the second moving direction is greater than or equal to the preset threshold, the difference between the reference shooting trajectory and the current shooting trajectory can be determined as not meeting the preset condition. As shown in FIG. 5, at this time the difference between the reference shooting trajectory and the current shooting trajectory does not meet the preset condition, and the orientation of the gimbal needs to be corrected. The preset threshold may be set based on actual needs or empirical values.

S307, determining the amount of adjustment control of the gimbal based on the current image frame and the reference image frame sequence, and adjusting the gimbal based on the amount of adjustment control. More specifically, the image registration can be performed based on the current image frame and the reference image frame sequence, and the amount of adjustment control of the gimbal can be determined based on the image registration result. The amount of adjustment control may include a first angle parameter (indicated by φ) and a second angle parameter (indicated by θ). In some embodiments, the first angle parameter may be the angle parameter of the gimbal in the horizontal direction, and the second angle parameter may be the angle parameter of the gimbal in the vertical direction.

In some embodiments, performing the image registration based on the current image frame and the reference image frame sequence may include the following processes.

S21, determining the starting position of the current shooting trajectory, and calculating the path length between the current sampling position and the starting position.

S22, determining a key image frame set from the reference image frame sequence based on the path length and the reference shooting trajectory, the key image frame set including two or more key image frames.

More specifically, the total path and the total duration of the reference shooting trajectory can be determined. It should be noted that, from the previous trajectory, the starting position (i.e., the initial position) of the current shooting trajectory can be determined based on any shooting position in the reference shooting trajectory. Therefore, the total path of the reference shooting trajectory may refer to the path between the reference staring position in the reference shooting trajectory and the end shooting position in the reference shooting trajectory. The reference starting position may refer to the shooting position corresponding to the starting position of the current shooting trajectory in the reference shooting trajectory. For example, the starting position of the current shooting trajectory may be determined based on the starting shooting position in the reference shooting trajectory, then the reference starting position may be the starting shooting position in the reference shooting trajectory. In another example, the starting position of the current shooting trajectory may be determined based on the midpoint shooting position in the reference shooting trajectory, then the reference starting position may be the midpoint shooting position in the reference shooting trajectory. Correspondingly, the total duration of the reference shooting trajectory may refer to the length of time between the shooting time corresponding to the reference starting position in the reference shooting trajectory and the shooting time corresponding to the end shooting position in the reference shooting trajectory.

After the total path and the total duration of the reference shooting trajectory are determined, the shooting time of the current image frame can be calculated based on the path length, the total path, and the total duration of the reference shooting trajectory. More specifically, a path ratio between the path length and the total path of the reference shooting trajectory can be calculated, and the product of the path ratio and the total duration of the reference shooting trajectory can be used as the shooting time of the current image frame. Assume the path length is $I_{ce}$, the total path of the reference shooting trajectory is $I_d$, and the total duration of the reference shooting trajectory is T, then the shooting time $t_c$ of the current image frame may be $t_c=(I_c/I_d)T$.

Subsequently, the key image frame set may be determined from the reference image frame sequence based on the shooting time of the current image frame. The time difference between the shooting time of each key image frame in the key image frame set and the shooting time of the current image frame may be smaller than a preset difference value, and the preset difference value may be set based on actual business requirements or empirical values. More specifically, the shooting time of each reference image frame in the reference image frame sequence can be obtained, and the time difference between the shooting time of each reference image frame and the shooting time of the current image frame can be calculated. The reference image frame corresponding to the time difference less than the preset difference value can be used as the key image frame and added to the key image frame set.

S23, performing image registration on the current image frame and each key image frame in the key image frame set.

More specifically, feature point description algorithms such as the SIFT algorithm can be used to extract feature points and descriptors in the current image frame and each key image frame respectively, then feature point matching can be performed based on the descriptor in the current image frame and the descriptor in each key image frame to obtain the image registration result.

In some embodiments, the image registration result may include the degree of matching of each key image frame in the key image frame set with the current image frame. Correspondingly, determining the amount of adjustment control of the gimbal based on the image registration result may include the following processes.

S31, determining a target image frame from the key image frame set based on the image registration result, the target image frame being the key image frame with the highest degree of matching in the key image frame set.

More specifically, the key image frame corresponding to the highest degree of matching can be selected from the key image frame set as the target image frame based on the image registration result. In one embodiment, in order to avoid mismatching caused by noise and improve the accuracy of the target image frame, when the target image frame is determined from the key image frame set based on the image registration result, a first key image frame corresponding to the highest degree of matching and a second key image frame corresponding to the second highest degree of matching can also be determined from the key image frame set based on the image registration result. The highest degree of matching may also be referred to as the first highest degree of matching, and the second highest degree of matching may also be referred to as the second highest degree of matching. The ratio of the degree of matching between the first key image frame and the second key image frame can be calculated. If the ratio of the degree of matching is greater than a preset ratio, the first key image frame may be determined as the target image frame. The preset ratio can be set and adjusted based on actual needs, and it can be an engineering experience value. In some embodiments, the difference in the degree of matching between the first key image frame and the second key image frame can also be calculated. If the degree of matching is greater than the preset threshold, the first key image frame may be determined as the target image frame. The preset threshold can be set and adjusted based on actual needs, and it can be an engineering experience value.

In some embodiments, after the target image frame is determined, the Epipolar constraint method and/or the RANSAC method can also be used to eliminate the outlier points of the target image frame, thereby improving the accuracy of the subsequent calculation of the angle difference.

S32, calculating the angle difference between the target image frame and the current image frame, and using the angle difference as the amount of adjustment control of the gimbal.

More specifically, when calculating the angle difference between the target image frame and the current image frame, an objective function can be established first based on the target image frame and the current image frame. The objective function may include the image scale parameter (s) and the pixel offset parameter ($\Delta p$). The objection function f(x) may be as shown in formula 1.2.

$$f(x) = \sum_{i=0}^{n}\left[s \cdot \left(x_1^i - \Delta p\right) - x_2^i\right]^2 \qquad \text{Formula 1.2}$$

where $x_1^i$ is the $i^{th}$ point on the current image frame, $x_2^i$ is the $i^{th}$ point corresponding to the match on the target image frame, and $s \cdot (x_1^i - \Delta P) - x_2^i$ is the difference between $x_2^i$ after $x_1^i$ has moved $\Delta p(\Delta u, \Delta v)$ (row and column pixels), and after the transformation of the image scale parameter s.

Subsequently, based on the principle of reducing the value of the objective function, the objective function can be optimized to determine the image scale value of the image scale parameter and the pixel offset value of the pixel offset parameter, as shown in Formula 1.3.

$$\arg\min_{s,\Delta p}\sum_{i=0}^{n}\left[s \cdot \left(x_1^i - \Delta p\right) - x_2^i\right]^2 \qquad \text{Formula 1.3}$$

where $$\underset{s,\Delta p}{\operatorname{argmin}}[f(x)]$$

is the minimal value of the objective function f(x) obtained by optimizing the objective function. In a specific implementation process, the objective function can be optimized by adjusting the value of s and Δp. In one embodiment, the value of the optimized objective functions may meet minimum conditions, where the image scale value may be the value of the image scale parameter in the objective function when the minimal condition is met, that is, the value of s, and the pixel offset value may be the value of the pixel off parameter in the objective function when the minimal condition is met, that is, the value of Δp.

Then, the internal parameters and image resolution of the imaging assembly can be obtained, and the angle difference between the target image frame and the current image frame can be calculated based on the internal parameters, the image resolution, and the image displacement value. The angle difference may include the first angle parameter φ and the second angle parameter θ. The specific calculation process may be as follow.

i. Calculate hFov and vFov based on factory calibration or internal parameters (Fov) and the image resolution of the imaging assembly provided by the manufacturer.

$$hFov = 2\tan^{-1}\left(\tan\left(\frac{Fov}{2}\right)\cdot\frac{w}{\sqrt{w^2+h^2}}\right)$$

$$vFov = 2\tan^{-1}\left(\tan\left(\frac{Fov}{2}\right)\cdot\frac{h}{\sqrt{w^2+h^2}}\right)$$

where Fov (field of view) is the Fov of the diagonal line of the imaging assembly sensor, hFov (horizontal field of view) is the Fov in the horizontal direction, vFov (vertical field of view) is the Fov in the vertical direction, w is the frame width (pixel) in the resolution, h is the frame height (pixel) in the resolution, and the ratio of w to h is generally 16:9 or 4:3, such as 1920*1080.

ii. Calculate the first angle parameter φ and the second angle parameter θ based on the image placement value Δp(Δu, Δv).

$$\varphi = \frac{\Delta u}{w}hFov$$

$$\theta = \frac{\pi}{2} = \frac{\Delta v}{h}vFov$$

In another embodiment, if an adjustment instruction is received, the gimbal may be adjusted based on the adjustment instruction. In an application scenario, the photographer may adjust the composition and the camera position based on the actual scene requirements, and input the adjustment instruction to correct the orientation of the gimbal based on the reference image frame sequence. After receiving the adjustment instruction from the photographer, the reference image frame sequence can be adjusted based on the adjustment instruction, and the adjusted reference image frame sequence may be used as a new reference image frame sequence to cover the reference image frame sequence before the adjustment. In the subsequent gimbal adjustment, the gimbal may be adjusted based on the new reference image frame sequence. It can be seen that in the subsequent image re-shooting, the reference image frame sequence may be adjusted and iterated, which is not exactly the same as the previous reference image frame sequence, and the reference image frame sequence can be updated in the continuous adjustment iteration.

In another application scenario, the photographer may input the adjustment instruction based on the current orientation of the gimbal. After receiving the adjustment instruction for the photographer, the gimbal may be adjusted directly based on the adjustment instruction.

Consistent with the present disclosure, the reference image frame sequence and the reference shooting trajectory formed by the movement of the mobile platform when shooting the reference image frame sequence can be obtained. During the image re-shooting process, the shooting angle can be estimated based on the reference shooting trajectory, and the gimbal can be adjusted based on the estimated shooting angle. The current image frame can be obtained, and the amount of adjustment control of the gimbal can be determined based on the current image frame and the reference image frame sequence, such that the gimbal can be adjusted based on the amount of adjustment control. In the gimbal adjustment process described above, the gimbal can be roughly adjusted based on the reference shooting trajectory. When the shooting trajectory changes slightly, the amount of adjustment control can be determined based on the current image frame and the previous reference image frame sequence. Based on the rough adjustment, the gimbal can be adjusted again based on the amount of adjustment control. In this way, the entire re-shooting process can be smoother and faster and the image frame sequence obtained by the re-shooting can meet the user's needs, thereby reducing the number of re-shooting and improving the re-shooting efficiency.

Figure 6:
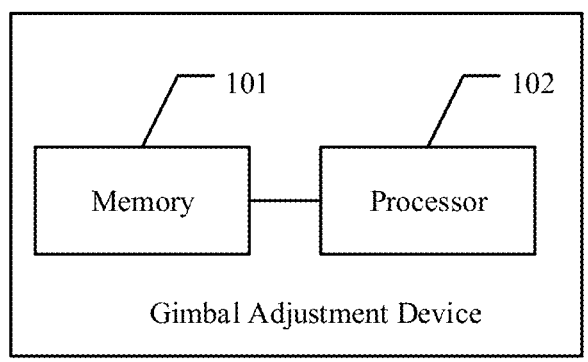
FIG. 6 is a schematic structural diagram of a gimbal adjustment device according to an embodiment of the present disclosure.

Based on the description of the above method embodiment, an embodiment of the present disclosure provides a schematic structural diagram of a gimbal adjustment device as shown in FIG. 6. The gimbal adjustment device as shown in FIG. 6 includes a memory 101 and a processor 102. The memory 101 can be configured to store program instructions. The processor 102 can be configured to execute the program instructions stored in the memory 101.

In some embodiments, the processor 102 may be a central processing unit (CPU). The processor may also be other general-purpose processors, that is, microprocessors or nay conventional processors, such as digital signal processors (DSPs), application specific integrated circuit (ASICs), off-the-shelf field programmable gate arrays (FPGAs), or other programmable logic devices, discrete gates or transistor logic devices, discrete hardware components, etc.

The memory 101 may include a read-only memory and a random access memory, and provide instructions and data to the processor 102. Therefore, the processor 102 and the processor 102 are not limited in the embodiments of the present disclosure.

In some embodiments, when executed by the processor, the program instructions can cause the processor to obtain a reference image frame sequence and a reference shooting trajectory formed by the movement of the mobile platform when the reference image frame sequence is taken, the reference image frame sequence including two or more reference image frames; estimate the shoot angle based on the reference shooting trajectory and adjust the gimbal based on the estimated shooting angle in the process of image re-shooting; obtaining the current image frame; and determining the amount of adjustment control of the gimbal based on the current image frame and the reference image frame sequence, and adjusting the gimbal based on the amount of adjustment control.

In some embodiments, when obtaining the current image frame, the program instructions can cause the processor to obtain an image collection taken by the imaging assembly, the image collection including one or more frame of images; and sampling the current image frame from the image collection based on the preset image sampling rule, the image sampling rule including the number of different pixels between the current image frame obtained by sampling and the image frame obtained by the previous sampling is within the preset range.

In some embodiments, when executed by the processor, the program instructions can cause the processor to obtain the current shooting trajectory formed by the movement of the mobile platform when shooting the current image frame; determine whether the difference between the reference shooting trajectory and the current shooting trajectory meets a preset condition; and perform the process of determining the amount of adjustment control of the gimbal based on the current image frame and the reference image frame sequence if the difference between the reference shooting trajectory and the current shooting trajectory meets the preset condition.

In some embodiments, when executed by the processor, the program instructions can cause the processor to calculate the target orientation of the gimbal based on the current sampling position and the historical reference position if the difference between the reference shooting trajectory and the current shooting trajectory does not meet the preset condition; and correct the orientation of the gimbal based on the direction of the target.

In some embodiments, when determining whether the difference between the reference shooting trajectory and the current shooting trajectory meets the preset condition, the program instructions can cause the processor to take the sampling position corresponding to the current image frame as the current sampling position, and take the sampling position corresponding to the image frame obtained in the previous sampling as the historical sampling position; determine the current reference position from the reference shooting trajectory based on the current sampling position, and determine the historical reference position from the reference shooting trajectory based on the historical sampling position; determine a first moving direction based on the current sampling position and the historical sampling position, and determine a second moving direction based on the current reference position and the historical reference position; and determine whether the difference between the reference shooting trajectory and the current shooting trajectory meets the preset condition based on the first moving direction and the second moving direction.

In some embodiments, when determining whether the difference between the reference shooting trajectory and the current shooting trajectory meets the preset condition based on the first moving direction and the second moving direction, the program instructions can cause the processor to determine that the difference between the reference shooting trajectory and the current shooting trajectory meets the preset condition if the difference between the first moving direction and the second moving direction is less than a preset threshold; and determine that the difference between the reference shooting trajectory and the current shooting trajectory does not meet the preset condition if the difference between the first moving direction and the second moving direction is greater than or equal to the preset threshold.

In some embodiments, when determining the amount of adjustment control of the gimbal based on the current image frame and the reference image frame sequence, the program instructions can cause the processor to perform initial image frame based on the current image frame and the reference image frame sequence; and determine the amount of adjustment control based on the image registration result.

In some embodiments, when performing the image registration based on the current image frame and the reference image frame sequence, the program instructions can cause the processor to determine the starting position of the current shooting trajectory, and calculate the path length between the current sampling position and the starting position; determine a key image frame set from the reference image frame sequence based on the path length and the reference shooting trajectory, the key image frame set including two or more key image frames; and perform image registration on the current image frame and each key image frame in the key image frame set.

In some embodiments, when determining the key image frame set from the reference image frame sequence based on the path length and the reference shooting trajectory, the program instructions can cause the processor to determine the total path and total duration of the reference shooting trajectory; calculate the shooting time of the current image frame based on the path length, the total path of the reference shooting trajectory, and the total duration of the reference shooting trajectory; and determine the key image frame set from the reference image frame sequence based on the shooting time of the current image frame, the time difference between the shooting time of each key image frame in the key image frame set and the shooting time of the current image frame being smaller than a preset difference.

In some embodiments, the image registration result may include the degree of matching between each key image frame in the key image frame set and the current image frame. When determining the amount of adjustment control of the gimbal based on the image registration result, the program instructions can cause the processor to determine the target image frame form the key image frame set based on the image registration result, the target image frame being the key image frame with the highest degree of matching in the key image frame set; and calculate the angle difference between the target image frame and the current image frame, and use the angle difference as an amount of adjustment control of the gimbal.

In some embodiments, when determining the target image frame form the key image frame set based on the image registration result, the program instructions can cause the processor to determine the first key image frame corresponding to the highest degree of matching and the second key image frame corresponding to the second highest degree of matching from the key image frame set based on the image registration result; calculate a ratio of degree of matching between the first key image frame and the second key image frame; and determine the first key image frame as the target image frame if the ratio of degree of matching is greater than a preset ratio.

In some embodiments, when calculating the angle difference between the target image frame and the current image frame, the program instructions can cause the processor to establish an objective function based on the target image frame and the current image frame, the objective function including the image scale parameter and the pixel offset parameter; optimize the objective function to determine the image scale value of the image scale parameter and the pixel offset value of the pixel offset parameter based on the principle of reducing the value of the objective function; and obtain the internal parameters and the image resolution of the imaging assembly, and calculate the angle difference between the target image frame and the current image frame based on the internal parameters, the image resolution, and the image displacement value.

In some embodiments, the value of the optimized objective function may meet the minimal condition, where the image scale value may be the value of the image scale parameter in the objective function when the minimal condition is met, and the pixel offset value may be the value of the pixel off parameter in the objective function when the minimal condition is met.

In some embodiments, the program instructions can cause the processor to determine an initial position of the image re-shooting if a start instruction of the image re-shooting is detected, the initial position can be used as the starting position of the current shooting trajectory; and start the image re-shooting if the image registration of the reference image frame and the initial image frame captured at the initial position is successful.

In some embodiments, the initial position may be determined based on any shooting position in the reference shooting trajectory.

In some embodiments, the program instructions can cause the processor to adjust the gimbal based on the adjustment instruction if an adjustment instruction is received.

Consistent with the present disclosure, the reference image frame sequence and the reference shooting trajectory formed by the movement of the mobile platform when shooting the reference image frame sequence can be obtained. During the image re-shooting process, the shooting angle can be estimated based on the reference shooting trajectory, and the gimbal can be adjusted based on the estimated shooting angle. The current image frame can be obtained, and the amount of adjustment control of the gimbal can be determined based on the current image frame and the reference image frame sequence, such that the gimbal can be adjusted based on the amount of adjustment control. In the gimbal adjustment process described above, the gimbal can be roughly adjusted based on the reference shooting trajectory. When the shooting trajectory changes slightly, the amount of adjustment control can be determined based on the current image frame and the previous reference image frame sequence. Based on the rough adjustment, the gimbal can be adjusted again based on the amount of adjustment control. In this way, the entire re-shooting process can be smoother and faster and the image frame sequence obtained by the re-shooting can meet the user's needs, thereby reducing the number of re-shooting and improving the re-shooting efficiency.

Based on the above description, an embodiment of the present disclosure further provides a mobile platform. The mobile platform may include an imaging assembly for shooting images; a gimbal for controlling the orientation of the imaging assembly; a body; a power system installed on the body to provide power for the mobile platform; and the gimbal adjustment device described above.

In some embodiments, the mobile platform may include a UAV or a gimbal camera.

The execution method and the beneficial effects of the mobile platform provided in this embodiment are similar to those of the gimbal adjustment device provided in the foregoing embodiments, which will not be repeated here.

It should be noted that for the specific working process of the mobile platform and the gimbal adjustment device described above, reference may be made to the relevant descriptions in the foregoing method embodiments, which will not be repeated here.

A person having ordinary skills in the art can understand that some or all of the steps of the above embodiments of the disclosed method may be implemented by a program instructing relevant hardware. The program may be stored in a computer-readable medium. When executed, the program may include one of the steps or a combination of the steps of the disclosed method. In some embodiments, the storage medium can be a magnetic disk, an optical disc, a read-only memory (ROM), or a random access memory (RAM), etc. That is, an embodiment of the present disclosure further provides a computer storage medium. The computer storage medium stores program instructions, and the program instructions can be executed by a processor to execute the gimbal adjustment method as shown in FIG. 2 and FIG. 3.

The above description merely illustrates some embodiments of the disclosure and is not intended to limit the scope of the disclosure. Those of ordinary skill in the art can understand all or some of the processes of implementing the above embodiments. Any equivalent changes in light of the claims of the present disclosure should all be covered by the scope of the present disclosure.

What is claimed is:

1. A gimbal adjustment method comprising:
    obtaining a reference image frame sequence and a reference shooting trajectory formed by a movement of a mobile platform when shooting the reference image frame sequence, the reference image frame sequence including two or more reference image frames, the mobile platform including a gimbal and an imaging assembly;
    estimating a shooting angle based on the reference shooting trajectory, and adjusting the gimbal based on an estimated shooting angle during an image re-shooting;
    obtaining a current image frame; and
    determining an amount of adjustment control of the gimbal based on the current image frame and the reference image frame sequence, and adjusting the gimbal based on the amount of adjustment control.

2. The method of claim 1, wherein obtaining the current image frame includes:
    obtaining an image collection taken by the imaging assembly, the image collection including one or more frames of images;
    sampling the current image frame from the image collection based on a preset image sampling rule, the image sampling rule including a number of different pixels between the current image frame obtained by sampling and the image frame obtained by a previous sampling is within a preset range.

3. The method of claim 2, further comprising:
    obtaining a current shooting trajectory formed by the movement of the mobile platform when shooting the current image frame;
    determining whether a difference between the reference shooting trajectory and the current shooting trajectory meets a preset condition; and
    determining the amount of adjustment control of the gimbal based on the current image frame and the reference image frame sequence when the difference between the reference shooting trajectory and the current shooting trajectory meets the preset condition.

4. The method of claim 3, further comprising:
calculating a target orientation of the gimbal based on a current sampling position and a historical reference position when the difference between the reference shooting trajectory and the current shooting trajectory does not meet the preset condition; and
correcting orientation of the gimbal based on the target orientation.

5. The method of claim 3, wherein determining whether the difference between the reference shooting trajectory and the current shooting trajectory meets the preset condition further includes:
taking a sampling position corresponding to the current image frame as the current sampling position, and taking a sampling position corresponding to the image frame obtained in the previous sampling as a historical sampling position;
determining a current reference position from the reference shooting trajectory based on the current sampling position, and determining the historical reference position from the reference shooting trajectory based on the historical sampling position;
determining a first moving direction based on the current sampling position and the historical sampling position, and determining a second moving direction based on the current reference position and the historical reference position; and
determining whether the difference between the reference shooting trajectory and the current shooting trajectory meets the preset condition based on the first moving direction and the second moving direction.

6. The method of claim 5, wherein determining whether the difference between the reference shooting trajectory and the current shooting trajectory meets the preset condition based on the first moving direction and the second moving direction includes:
determining the difference between the reference shooting trajectory and the current shooting trajectory meets the preset condition when a difference between the first moving direction and the second moving direction is less than a preset threshold; and
determining the difference between the reference shooting trajectory and the current shooting trajectory does not meet the preset condition when the difference between the first moving direction and the second moving direction is greater than or equal to the preset threshold.

7. The method of claim 3, wherein determining the amount of adjustment control of the gimbal based on the current image frame and the reference image frame sequence includes:
performing image registration based on the current image frame and the reference image frame sequence; and
determining the amount of adjustment control of the gimbal based on an image registration result.

8. The method of claim 7, wherein performing image registration based on the current image frame and the reference image frame sequence includes:
determining a starting position of the current shooting trajectory, and calculating a path length between the current sampling position and the starting position;
determining a key image frame set from the reference image frame sequence based on the path length and the reference shooting trajectory, the key image frame set including two or more key image frames; and
performing image registration on the current image frame and each key image frame in the key image frame set.

9. The method of claim 8, wherein determining the key image frame set from the reference image frame sequence based on the path length and the reference shooting trajectory includes:
determining a total path and a total duration of the reference shooting trajectory;
calculating a shooting time of the current image frame based on the path length, the total path of the reference shooting trajectory, and the total duration of the reference shooting trajectory; and
determining the key image frame set from the reference image frame sequence based on the shooting time of the current image frame, a time difference between the shooting time of each key image frame in the key image frame set and the shooting time of the current image frame being less than a preset difference value.

10. The method of claim 8, wherein:
the image registration result includes a degree of matching between each key image frame in the key image frame set and the current image frame; and
determining the amount of adjustment control of the gimbal based on the image registration result includes:
determining a reference image frame from the key image frame set based on the image registration result, the target image frame being a key image frame with a highest degree of matching in the key image frame set; and
calculating an angle difference between the target image frame and the current image frame, and using the angle difference as the amount of adjustment control of the gimbal.

11. The method of claim 10, wherein determining the target image frame from the key image frame set based on the image registration result includes:
determining a first key image frame corresponding to the highest degree of matching and a second key image frame corresponding to a second highest degree of matching from the key image frame set based on the image registration result;
calculating a ratio of the degree of matching between the first key image frame and the second key image frame; and
determining the first key image frame as the target image frame when the ratio of the degree of matching is greater than a preset ratio.

12. The method of claim 10, wherein calculating the angle difference between the target image frame and the current image frame includes:
establishing an objective function based on the target image frame and the current image frame, the objective function including an image scale parameter and a pixel offset parameter;
optimizing the objective function to determine an image scale value of the image scale parameter, and a pixel offset value of the pixel offset parameter based on the principle of reducing a value of the objective function; and calculating the angle difference between the target image frame and the current image frame based on the internal parameters, the image resolution, and an image displacement value.

13. The method of claim 11, wherein:
the value of the optimized objective function meets a minimal condition;
the image scale value is a value of the image scale parameter in the objective function when the minimal condition is met; and the pixel offset value is a value of the pixel offset parameter in the objective function when the minimal condition is met.

14. The method of claim 3, further comprising:
determining an initial position of the image re-shooting when a start instruction for image re-shooting is detected, the initial position being used as the starting position of the current shooting trajectory;
obtaining a reference image frame from the reference image frame sequence based on the initial position, a shooting position corresponding to the reference image frame corresponding to the initial position; and
starting the image re-shooting when the image registration of the reference image frame and the initial image frame captured at the initial position is successful.

15. A gimbal adjustment device comprising:
a processor; and
a storage device storing program instructions that, when being executed by the processor, cause the processor to:
obtain a reference image frame sequence and a reference shooting trajectory formed by a movement of a mobile platform when shooting the reference image frame sequence, the reference image frame sequence including two or more reference image frames, the mobile platform including a gimbal and an imaging assembly;
estimate a shooting angle based on the reference shooting trajectory, and adjust the gimbal based on an estimated shooting angle during an image re-shooting;
obtain a current image frame; and
determine an amount of adjustment control of the gimbal based on the current image frame and the reference image frame sequence, and adjust the gimbal based on the amount of adjustment control.

16. The device of claim 15, wherein when obtaining the current image frame, the program instructions further cause the processor to:
obtain an image collection taken by the imaging assembly, the image collection including one or more frames of images;
sample the current image frame from the image collection based on a preset image sampling rule, the image sampling rule including a number of different pixels between the current image frame obtained by sampling and the image frame obtained by a previous sampling is within a preset range.

17. The device of claim 16, wherein the program instructions further cause the processor to:
obtain a current shooting trajectory formed by the movement of the mobile platform when shooting the current image frame;
determine whether a difference between the reference shooting trajectory and the current shooting trajectory meets a preset condition; and
determine the amount of adjustment control of the gimbal based on the current image frame and the reference image frame sequence when the difference between the reference shooting trajectory and the current shooting trajectory meets the preset condition.

18. The device of claim 17, wherein the program instructions further cause the processor to:
calculate a target orientation of the gimbal based on a current sampling position and a historical reference position when the difference between the reference shooting trajectory and the current shooting trajectory does not meet the preset condition; and
correct orientation of the gimbal based on the target orientation.

19. The device of claim 17, wherein when determining the amount of adjustment control of the gimbal based on the current image frame and the reference image frame sequence, the program instructions further cause the processor to:
perform image registration based on the current image frame and the reference image frame sequence; and
determine the amount of adjustment control of the gimbal based on an image registration result.

20. A mobile platform comprising:
an imaging assembly configured to capture images;
a gimbal configured to control an orientation of the imaging assembly;
a body;
a power system disposed on the body to provide power to the mobile platform; and
a gimbal adjustment device including a processor and a storage device storing program instructions that, when being executed by the processor, cause the processor to:
obtain a reference image frame sequence and a reference shooting trajectory formed by a movement of a mobile platform when shooting the reference image frame sequence, the reference image frame sequence including two or more reference image frames, the mobile platform including a gimbal and an imaging assembly;
estimate a shooting angle based on the reference shooting trajectory, and adjust the gimbal based on an estimated shooting angle during an image re-shooting;
obtain a current image frame; and
determine an amount of adjustment control of the gimbal based on the current image frame and the reference image frame sequence, and adjust the gimbal based on the amount of adjustment control.

* * * * *